United States Patent
Mourikis et al.

(10) Patent No.: US 10,306,206 B2
(45) Date of Patent: May 28, 2019

(54) 3-D MOTION ESTIMATION AND ONLINE TEMPORAL CALIBRATION FOR CAMERA-IMU SYSTEMS

(71) Applicant: The Regents of the University of California, Riverside, CA (US)

(72) Inventors: Anastasios Mourikis, Riverside, CA (US); Mingyang Li, Riverside, CA (US)

(73) Assignee: The Regents of The University of California, Oakland, CA (US)

( * ) Notice: Subject to any disclaimer, the term of this patent is extended or adjusted under 35 U.S.C. 154(b) by 315 days.

(21) Appl. No.: 14/339,276

(22) Filed: Jul. 23, 2014

(65) Prior Publication Data

US 2015/0201180 A1    Jul. 16, 2015

Related U.S. Application Data

(60) Provisional application No. 61/857,591, filed on Jul. 23, 2013.

(51) Int. Cl.
| | |
|---|---|
| *H04N 13/204* | (2018.01) |
| *H04N 5/247* | (2006.01) |
| *G06T 7/80* | (2017.01) |
| *G06T 7/73* | (2017.01) |
| *H04N 13/296* | (2018.01) |
| *H04N 13/00* | (2018.01) |
| *G06K 9/00* | (2006.01) |
| *G01C 21/16* | (2006.01) |

(52) U.S. Cl.
CPC ............. *H04N 13/204* (2018.05); *G06T 7/73* (2017.01); *G06T 7/80* (2017.01); *H04N 5/247* (2013.01); *H04N 13/296* (2018.05); *G01C 21/165* (2013.01); *G06K 9/00671* (2013.01); *G06T 2207/10016* (2013.01); *G06T 2207/30244* (2013.01); *H04N 2013/0085* (2013.01)

(58) Field of Classification Search
None
See application file for complete search history.

(56) References Cited

U.S. PATENT DOCUMENTS

| | | | |
|---|---|---|---|
| 9,031,782 B1* | 5/2015 | Lemay | G01C 21/00 701/445 |
| 2003/0053416 A1* | 3/2003 | Ribas-Corbera | H04N 19/172 370/233 |
| 2007/0118286 A1* | 5/2007 | Wang | G01C 21/165 342/357.59 |

OTHER PUBLICATIONS

Fleps et al., Optimization Based IMU Camera Calibration, Sep. 25-30, 2011, IEEE/RSJ International Conference on Intelligent Robots and Systems, pp. 3297-3304.*

(Continued)

*Primary Examiner* — James M Anderson, II
(74) *Attorney, Agent, or Firm* — Jeffrey G. Sheldon; Katherine B. Sales; Cislo & Thomas LLP

(57) ABSTRACT

A system and method for a 3-D motion estimation and online temporal calibration having one or more than one processor, one or more than one camera, one or more than one inertial sensor, a storage for storing data and instructions. The stored instructions comprise a filter estimation module, high-precision navigation instructions and consistent state estimates in scenarios involving features, with both constant and time-varying offsets from the filter estimation module.

17 Claims, 9 Drawing Sheets

(56) References Cited

OTHER PUBLICATIONS

Weiss et al., Real-time Onboard Visual-Inertial State Estimation and Self-Calibration of MAVs in Unknown Environments, May 14-18, 2012, IEEE International Conference on Robotics and Automation, pp. 957-964.*

Mingyang Li and Anastasios I. Mourikis, "3-D Motion Estimation and Online Temporal Calibration for Camera-IMU Systems," Department of Electrical Engineering, University of California, Riverside, pp. 1-8.

* cited by examiner

3-D MOTION ESTIMATION AND ONLINE TEMPORAL CALIBRATION FOR CAMERA-IMU SYSTEMS

CROSS-REFERENCE TO RELATED APPLICATIONS

The present application is a non-provisional patent application and claims the benefit of U.S. Provisional Patent Application 61/857,591, titled "3-D Motion Estimation and Online Temporal Calibration for Camera IMU Systems," filed Jul. 23, 2013; the contents of which are incorporated in this disclosure by reference in their entirety.

FEDERALLY SPONSORED RESEARCH/DEVELOPMENT

This invention was made with government support under IIS-1117957 awarded by the National Science Foundation. The government may have certain rights in the invention.

FIELD OF THE INVENTION

The present invention relates to 3-D motion estimation systems, and more specifically to a 3-D motion estimation and online temporal calibration system using a camera and an inertial measurement unit.

BACKGROUND

In applications ranging from aerial vehicles and ground robots to emergency-personnel navigation and augmented-reality for handheld devices, accurate 3D pose estimates are crucial. The current focus is on vision-aided inertial navigation methods that provide estimates by fusing measurements from a camera and an inertial measurement unit (IMU). In recent years, several algorithms of this kind have been proposed, tailored for different applications. For instance, if features with known coordinates are available, map-based localization algorithms can be used to provide absolute-pose estimates. In an unknown environment, simultaneous localization and mapping (SLAM) methods can be used for jointly estimating 3D motion and the positions of visual landmarks. Finally, if estimates for the vehicle's motion are needed but no map building is required, visual-inertial odometry methods can be employed.

For systems using estimation algorithms to perform well in any of these cases, both the spatial and the temporal relationship between the IMU and camera data streams must be accurately modeled. The first of these problems, often termed extrinsic sensor calibration, has been addressed previously. The transformation (i.e., rotation and translation) between the camera and IMU frames can be estimated either via an offline calibration process with a known calibration pattern, or online along with the IMU trajectory. However, the problem of temporal calibration between the data streams of the camera and the IMU has largely been left unexplored.

To enable the processing of the sensor measurements in an estimator, a timestamp is typically obtained for each camera image and IMU sample. This timestamp is taken either from the sensor itself, or from the OS of the computer receiving the data. These timestamps, however, are typically inaccurate. Specifically, due to the time needed for data transfer, sensor latency, and operating-system overhead, a delay that is different for each sensor, exists between the actual sampling of a measurement and the generation of its timestamp. Additionally, if different clocks are used for time-stamping (e.g., on different sensors), these clocks may suffer from clock skew. As a result, an unknown time offset typically exists between the timestamps of the camera and the IMU. If this time offset is not estimated and accounted for, it will introduce unmodeled errors in the estimation process, and reduce its accuracy.

With the exception of the work described in previous literature on offline vision aided inertial navigation, the prior art has not addressed the problem of estimating time offsets online. Currently, algorithm and system developers either determine this offset using hardware-specific knowledge, or develop offline methods for estimating the time offset on a case-by-case basis, or assume that the time offset is sufficiently small so that it can be ignored. However, these solutions are not general enough, and in the case where the time offset is varying over time (e.g., due to clock skew), can lead to eventual failure of the estimator.

Therefore, there is a need for a 3-D motion estimation and online temporal calibration system for a camera inertial measurement unit that overcomes the limitations of the prior art.

SUMMARY

The present invention satisfies the need in the prior art of 3-D pose motion estimation systems. The system provides high-precision, consistent estimates, in scenarios involving either known or unknown features, with both constant and time-varying offsets. The system utilizes an online temporal calibration system in conjunction with measurements obtained from a camera and an inertial measurement unit. In the system, the time offset that inevitably exists between the fused visual and inertial measurements is treated as an additional state variable to be estimated along with all other variables of interest. Identifying the time offset guarantees that the online estimation performed by the system will be successful, even if the time offset is drifting over time.

In particular, the system comprises one or more than one processor; one or more than one camera operably connected to the one or more than one processor; one or more than one inertial sensor operably connected to the one or more than one processor; a storage for storing data and instructions executable on the one or more than one processor comprising an estimation module that computes: estimates for a state of the system and estimates for the temporal relationship between the camera and the inertial data.

The system may be implemented where the camera and the inertial measurement are in an environment containing features with known 3D coordinates or in an environment containing features with a priori unknown 3D coordinates. The system comprises extended-Kalman filter based estimators for both cases. The filter estimates comprise an inertial measurement unit state, comprising an inertial measurement unit position, velocity, orientation, and biases; the spatial transformation between the camera and inertial measurement unit frames; time offsets between sensor data streams; and positions of visual features. The estimation module uses a time offset to represent the temporal relationship to be estimated from the data of one or more than one camera and the one or more than one inertial sensor. The time offset for each camera is the amount of time that the one or more than one camera timestamp is shifted, so that the one or more than one camera and the inertial measurement unit data streams become temporally consistent. The state of the system comprises one or more than one of the position, orientation, or velocity of the system. Additionally, the state of the system may include a description of the spatial configuration between the one or more than one camera and inertial sensors.

The invention provides a method for a 3-D motion estimation and online temporal calibration system, the method comprising the steps of: provide the system instructions executable on the one or more than one processor for the steps of: receiving at least one visual image from the one or more than one camera; receiving at least one inertial measurement from the one or more than one inertial sensor; receiving at least one visual image timestamp for the at least one visual image; receiving at least one inertial measurement timestamp for the at least one inertial measurement; and calculating a time offset estimate from the at least one visual image timestamp and the at least one inertial measurement timestamp using a filter.

Furthermore, the method described above may comprise extracting motion information from feature measurements and fusing the extracted motion information with state estimates; receiving a measurement with timestamp from the camera; propagating the state estimates from inertial measurement unit measurements; processing camera measurements for updating the state estimate; modeling effects of the unknown time offset and estimating a time offset online by computing Jacobian matrices of the measurements with respect to the unknown time offset. The method may further comprise concurrently calculating estimates of the time offset and the camera-to-inertial measurement unit extrinsics for visual-inertial odometry and a step of calculating temporal and spatial alignment between the one or more than one camera and the one or more than one inertial measurement unit.

BRIEF DESCRIPTION OF THE DRAWINGS

These and other features, aspects and advantages of the present invention will become better understood with regard to the following description, appended claims, and accompanying figures where:

DETAILED DESCRIPTION

Figure 1:
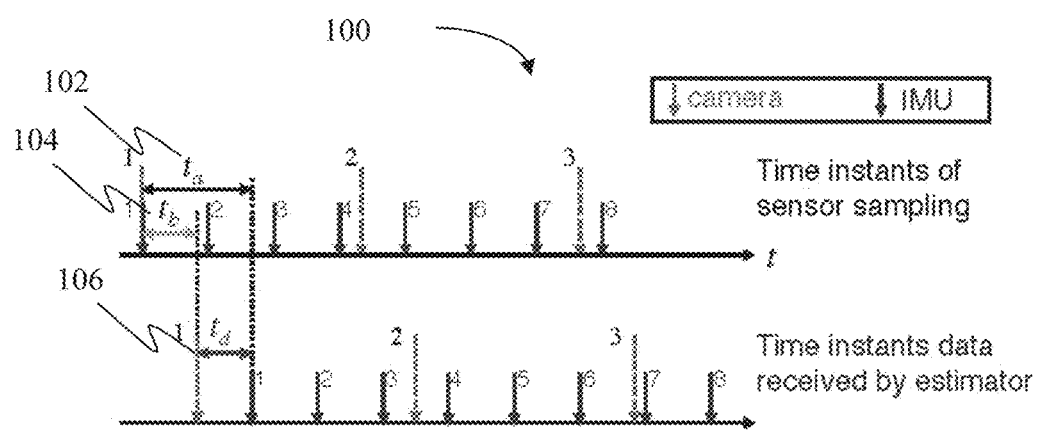
FIG. 1 is a diagram of a time offset arising due to latency in sensor data.

The present invention overcomes the limitations of the prior art by providing a 3-D motion estimation and online temporal calibration system for a camera inertial measurement unit. When fusing visual and inertial measurements for motion estimation, each measurement's sampling time must be precisely known. This requires knowledge of the time offset that inevitably exists between the two sensors' data streams. The system provides an online approach for estimating this time offset, by treating it as an additional state variable to be estimated along with all other variables of interest, including for instance IMU pose and velocity, biases, camera-to-IMU transformation, and feature positions. There is also provided a method that can be used in pose tracking with mapped features, in SLAM, and in visual-inertial odometry. An identifiability analysis proves that the time offset is identifiable, except in a small number of degenerate motion cases, that are characterized in detail. These degenerate cases are either (i) cases known to cause loss of observability even when no time offset exists, or (ii) cases unlikely to occur in practice. The system has been used in simulations and real-world experiments to validate these findings. The results demonstrate that the system yields high-precision, consistent estimates, in scenarios involving either known or unknown features, with both constant and time-varying offsets.

In contrast to the prior art systems and methods, the present invention provides a systematic approach for estimating the time offset online during vision-aided inertial navigation, and a theoretical analysis of its properties. Specifically, the first contribution is a formulation for the online estimation of the time offset in online estimation algorithms. The system explicitly includes the time offset in the EKF state vector, and estimates it concurrently with all other states of interest. This method is applicable in both known and unknown environments (i.e., in both map-based estimation, and in SLAM/visual-inertial odometry), and with both feature-based and pose-based estimator formulations. The system comprises extended-Kalman-filter (EKF)-based estimators for all these cases. These estimators jointly estimate (i) IMU states, comprising the IMU position, velocity, orientation, and biases, (ii) transformations between the camera and IMU frames, (iii) time offsets between the sensors' data streams, and (iv) positions of visual features, if desired. Compared to the "standard" algorithms, that require the time-offset to be perfectly known in advance, the present invention only incurs a minimal computational overhead, as it only requires one additional scalar variable to be included in the estimator's state.

In another embodiment of the invention, there is an identifiability analysis of the time offset between the camera and IMU. In particular, the analysis is for the case where the time offset, feature positions, camera-to-IMU transformation, and IMU biases are all unknown, and need to be estimated along with the IMU trajectory. Even for this challenging scenario, the formulation of the time offset is locally identifiable for general motion, that enables the system to accurately estimate the time offset. Moreover, the system characterizes the critical trajectories that cause loss of identifiability. These are either: (i) cases that are known to be degenerate even when the time offset is perfectly known (e.g., constant-velocity motion), or (ii) cases that are unlikely to occur in practice. Thus, including the time offset in the estimated state vector does not introduce new, practically significant critical trajectories for identifiability/observability. Moreover, the system can utilize the knowledge of the critical motion cases, to determine if the estimation of the time-offset should be temporarily disabled.

The identifiability of the time offset guarantees that the online estimation performed by the system will be successful, even if the time offset is drifting over time. Experimental and simulation results confirm that the system and methods yield high-precision, consistent state estimates, in scenarios involving either known or unknown features, with both constant and time-varying offsets. Importantly, the accuracy obtained when estimating the time offset online by the system is almost indistinguishable to the precision obtainable if the time offset was perfectly known in advance. These results, together with the fact that the inclusion of the time offset in the filter's state vector causes minimal increase in the estimator's complexity, demonstrate the practical advantages of the online temporal calibration of camera-IMU systems.

Detailed descriptions of the mathematical proofs for the invention can be found in: *Online Temporal Calibration for Camera-IMU Systems: Theory and Algorithms* by Mingyang Li and Anastasios I. Mourikis; Dept. of Electrical Engineering, University of California, Riverside; and *3-D Motion Estimation and Online Temporal Calibration for Camera-IMU Systems* by Mingyang Li and Anastasios I. Mourikis Dept. of Electrical Engineering, University of California, Riverside. Both texts are hereby incorporated by reference in their entirety.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention.

The term "EKF-SLAM," refers to algorithms and methods that utilize the extended Kalman filter (EKF) for simultaneous localization and mapping (SLAM). Typically, EKF SLAM algorithms and methods are feature based, using a maximum likelihood algorithm for data association.

The term "inertial measurement unit," ("IMU") refers to one or more than one device that measures and reports one or more of the following: rotational velocity, orientation, specific force, acceleration, gravitational force or motion-descriptive quantities, using accelerometers, gyroscopes, magnetometers and/or other sensors.

Referring now to FIG. 1, there is shown a diagram 100 of a time offset arising due to latency in sensor data. As can be seen, IMU data arrives with a latency $t_a$ 102, while the camera data have a latency $t_b$ 104, both of which are unknown. Since $t_a$ 102 and $t_b$ 104 are different, the system's estimator can receive measurements that were recorded simultaneously (e.g., the first IMU and camera measurement) with timestamps that are offset by $t_d = t_a - t_b$ 106.

In a first case, there is a system comprising a camera and IMU moving in an environment containing features with known 3D coordinates. In one embodiment, each sensor provides measurements at an approximate constant frequency that is known to some level of accuracy. However, there exists an unknown time offset $t_d$ 106 between the two sensors' reported timestamps. As can be seen, FIG. 1 illustrates how the time offset can arise due to differences in each sensor's latency. However, $t_d$ 106 may also arise due to synchronization errors between different clocks, clock skew, missing data, and other reasons. For the purposes of the following description, $t_d$ 106 is defined as the amount of time by which the camera timestamps must be shifted, so that the camera and IMU data streams become temporally consistent. Note that $t_d$ 106 may have a positive or negative value: if the IMU has a longer latency than the camera, then $t_d$ 106 is positive, while in the opposite case $t_d$ 106 is negative.

To estimate $t_d$ 106, it is included as an additional state variable in the state vector of the estimator employed for 3-D pose estimation. In one embodiment, when a measurement with timestamp t is received from the camera, the method uses an IMU measurements to propagate the state estimates until time $t+\hat{t}_d$, where $\hat{t}_d$ is the current estimate of the time offset. Then, at this time the camera measurement is processed (that can be in the form of point feature, line feature, or other feature measurements), for updating the state estimate. Next, the effect of the time offset is modeled, and the estimation of the time offset online is facilitated, by computing the Jacobian matrices of the measurements with respect to $t_d$ 106. These Jacobians are subsequently calculated by the estimator's using algorithms of equations, in a manner similar to the Jacobians with respect to other state variables, to compute updated values for state variables that include $t_d$ 106

Optionally, the Jacobians can be computed by differentiation, as described above as well as in the following description. Matrices that describe the rate of change of the measurements as a function of the rate of change of $t_d$ 106 can be evaluated numerically, via statistical methods, or with other means, as will be understood by those with skill in the art with reference to this disclosure. Moreover, the matrices may be modified in order to ensure appropriate observability properties of linearized system model.

Note: even though the camera measurement is recorded at time $t+t_d$, but it is being processed at $t+\hat{t}_d$. Since the estimate of the time offset will contain some error, the measurement will inevitably be processed at a slightly incorrect time instant. However, the system explicitly accounts for this fact. Specifically, since $t_d$ 106 is included in the estimated state vector, the estimator keeps track of the uncertainty in $\hat{t}_d$, via the state covariance matrix or a similar quantity. Therefore, the uncertainty in the time offset is explicitly modeled and accounted for in the computation of the state update. As a result, the system is capable of providing more accurate pose estimates and a better characterization of their uncertainty.

The preceding discussion describes time-offset estimation in one embodiment of the system when the feature positions in the world are known to the system a priori. In many cases, however, motion estimation must occur in previously unknown environments where it is not possible to have a feature map, or where only a subset of the features have known positions. Several systems and algorithms have been developed for vision-aided inertial navigation in this type of applications. Broadly, these systems use visual measurements in one of two ways: 1) feature-based methods include feature states in the state vector being estimated, following the EKF-SLAM paradigm, and employ the feature observations directly for state updates; and 2) pose-based methods that may not include feature states in the state vector, and instead maintain a state vector containing a number of poses. In these methods, the feature measurements are first used to define constraints between two or more poses (e.g., to estimate the relative motion between consecutive images), and these constraints are subsequently used for updates.

The system used in the present invention uses a time-offset estimation by explicitly including $t_d$ in the estimator's state vector so that it can be readily applied in both types of methods.

In feature-based algorithms (for instance, EKF-SLAM algorithms) the state vector calculated by the system is augmented with the positions of the features detected by the camera. Thus, the state vector contains the IMU state, the camera-to-IMU transformation (if its online estimation is needed), N features, and possibly additional quantities of interest. The method describes an approach to system design, that includes the time offset as part of the state vector, and compute Jacobians of the measurements with respect to the time offset, in a manner similar to what was described above using known features. As a result, when the state of the estimator is updated, the time-offset estimate is also updated.

In pose-based algorithms, the state vector typically comprises the current IMU state, as well as M poses (with $M \geq 1$), corresponding to the time instants M images were recorded by the system, among other quantities. When a new image is received by the system, the state vector is augmented to include a copy of the current camera pose, and certain poses are optionally removed. The features can be tracked in the images, and used for deriving constraints between the camera poses.

In order for the system to estimate the extrinsic calibration and time offset between the camera and IMU in this setting, these parameters can be included in the state vector. To account for these additional parameters, only minimal modifications are needed in the equations calculated by the system.

In another embodiment, state augmentation can be modified, in order to account for the presence of a time offset. More specifically, when a new image is received with timestamp t, the system augments the state vector to include an estimate of the camera pose at time $t+t_d$ (instead of time t, as typical). The system uses the IMU measurements to propagate up to $t+t_d$, at which point the system augments the state with the estimate of the camera pose at $t+t_d$. Using this method, Jacobian matrices with respect to $t_d$ can be computed, in order to properly model the uncertainty in the timestamp.

After the augmentation has been performed by the system, the feature measurements can be used for updates with little or no further alterations in the "traditional" approach. Since the dependence of the camera poses on $t_d$ has been modeled (via the Jacobian matrices computed during state augmentation), when the update is performed $t_d$ will also be updated, as normal in prior art systems.

In a different embodiment of pose-based estimators, the effect of the unknown time offset can be modeled, and its estimation can be effected, by computing the Jacobians of the feature measurements with respect to $t_d$, similarly to the preceding cases of SLAM and map-based estimation.

In yet another embodiment, the feature measurements can be processed to extract motion information, which are subsequently fused with the state estimates and/or IMU measurements, while accounting for the presence of an unknown time offset via appropriate Jacobian matrices.

Note: although the preceding description focuses primarily on the methods implemented in estimators that broadly follow the EKF-based approach, other methods are possible. The description is not made to be limiting, but only used as an exemplar of what is possible using this and other methods where the time-offset between the camera and IMU can be explicitly included in the state vector and estimated online. The key to achieving this is to model the dependence of the measurements on the time offset, by computing the appropriate Jacobians with respect to $t_d$. It is important to point out that a similar approach can be followed in methods that employ iterative minimization for pose estimation, either in batch or in incremental form. By including $t_d$ in the estimated state vector, and computing Jacobians with respect to it, the system can estimate it jointly with all other states of interest.

The preceding sections described a system using online algorithms for estimating a time offset between a camera and IMU. However, for these algorithms to be able to obtain meaningful results, the time offset must be identifiable given available measurements. In the attached document: *Online Temporal Calibration for Camera-IMU Systems: Theory and Algorithms* by Mingyang Li and Anastasios I. Mourikis; Dept. of Electrical Engineering, University of California, Riverside, It is analytically proven that $t_d$ is, in general locally identifiable. Therefore, camera and IMU measurements are used, along with system dynamics, to derive constraint equations that the states must satisfy, and subsequently compute the Jacobians of these constraints with respect to the states sought. The identifiability is proven by showing that the Jacobian matrices have full column rank.

The key result is that in general, $t_d$ is locally identifiable, and it may become unidentifiable only when both the orientation and the position of the moving platform follow specific motion patterns. By examining the nature of these motion patterns, it has been found that there exist only a few cases of practical significance. The most important one that of constant accelerometer measurements, that can arise when a platform is accelerating at a constant rate with no rotation, or when the platform is moving at constant velocity and rotations occur only about the direction of gravity. However, these scenarios would result in loss of observability even if $t_d$ was perfectly known. Thus, the system's estimation of $t_d$ online does not appear to result in any new degenerate trajectories with practical significance.

The theoretical result validates the algorithms and systems described in the preceding sections. Moreover, the system can employ this result to determine the cases in which $t_d$ becomes unidentifiable, for instance in order to disable the online estimation of the time offset for a period of time.

Results from a practical use of the system in indoor localization in an office environment, and outdoor localization while driving in an urban environment are now described to further explain the methods and systems presented herein. The visual-inertial system used comprised a PointGrey Bumblebee2 stereo pair (using a single camera) and an Xsens MTI-G unit. The IMU reported inertial measurements at 100 Hz, while the camera captured images at 20 Hz.

Figure 2:
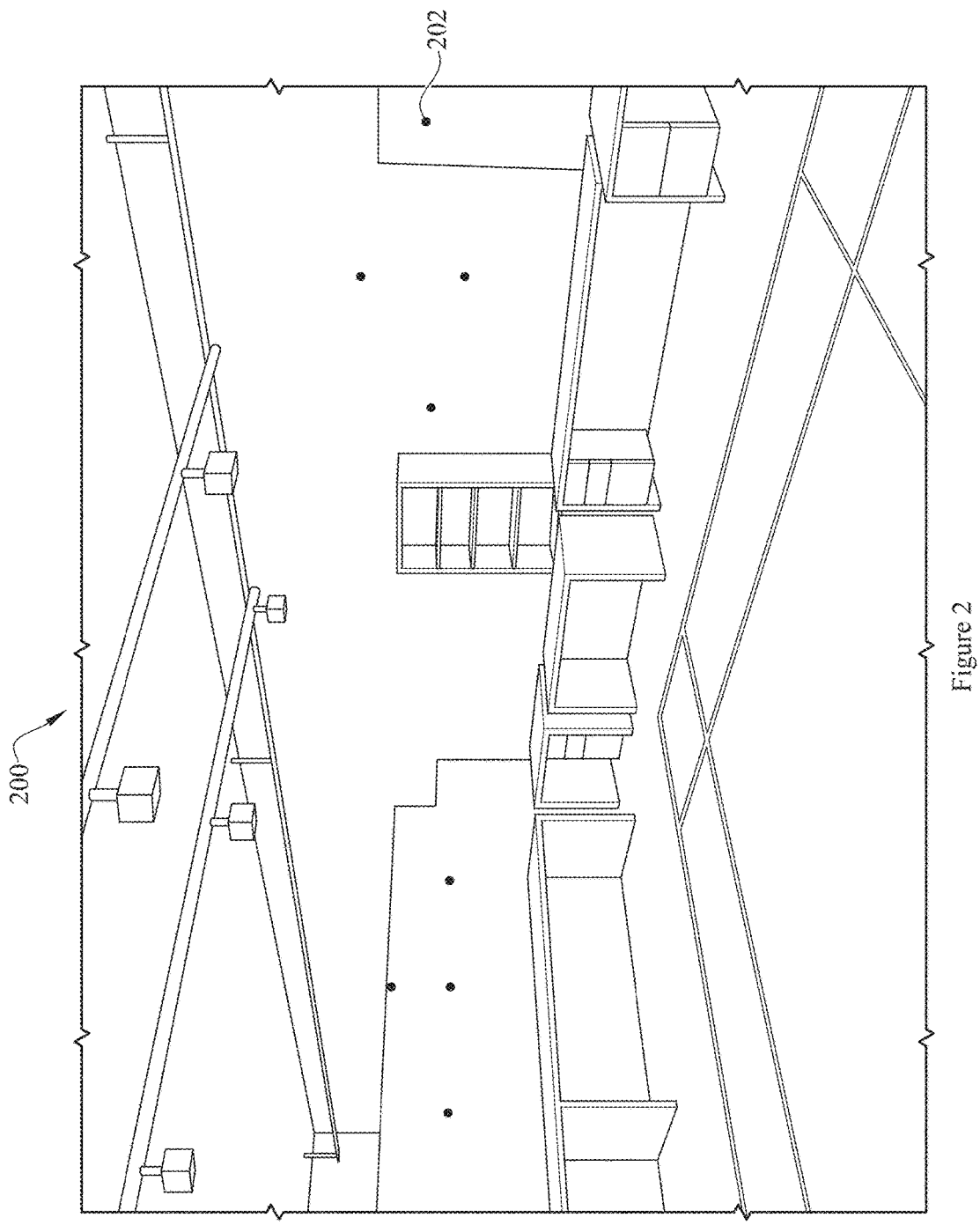
FIG. 2 is a diagram of a picture of an area used for indoor experimental testing.

Referring to FIG. 2, there is shown a picture of an area 200 used for indoor experimental testing. The environment for the indoor-localization experiment comprised twenty blue LED lights 202 with accurately known positions used as the mapped visual features for localization. During the experiment, the sensor platform started from a known initial position, and was moved in two loops around the room, returning to its initial location after each one. Since no high-precision ground truth was otherwise available, this motion pattern provided three time instants in the trajectory, for which the estimation errors can be computed by the system.

Figure 3:
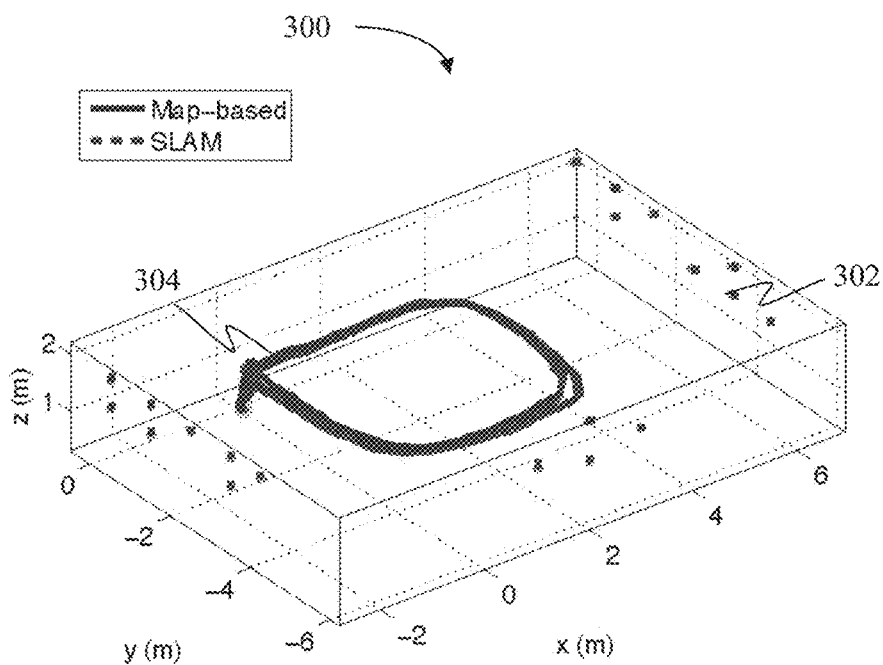
FIG. 3 is a diagram of trajectory estimates and feature positions for the area of FIG. 2.

Referring now to FIG. 3, there is shown a diagram 300 of trajectory estimates and feature positions for the area of FIG. 2. FIG. 3 shows the trajectory estimated by the algorithm described above and the positions of the mapped features 302 (shown by asterisks). For the known positions in the trajectory, the maximum estimation error was found to be 4.6 cm, which is commensurate with the covariance matrix reported by the filter at these locations.

Figure 4:
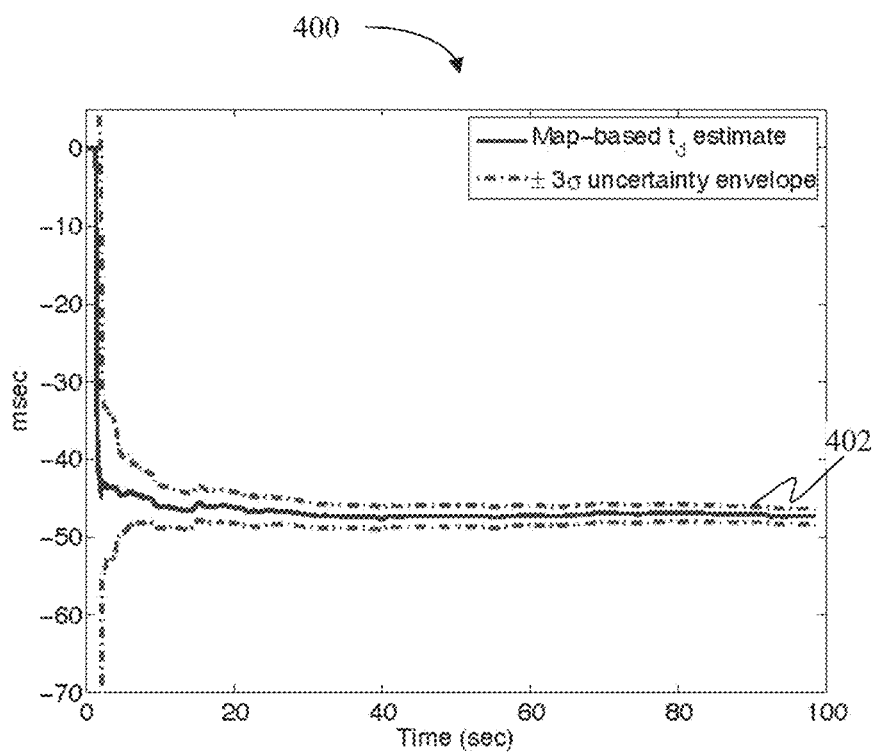
FIG. 4 is a chart plotting a time-offset estimate and corresponding ±3 standard-deviations uncertainty envelope, computed from the covariance matrix reported by the system.

Referring now to FIG. 4, there is shown a chart 400 plotting a time-offset estimate and corresponding ±3σ (i.e., ±3 standard deviations) uncertainty envelope computed from the covariance matrix reported by the system. A plot of the estimate 402 of the time offset, $t_d$ 106 calculated by the system, as well as the uncertainty envelope defined by ±3 times the standard deviation reported by the EKF. It can be seen that within the first few seconds the estimate calculated by the system converges very close to its final value, and that the uncertainty in the estimate drops rapidly. The standard deviation of $t_d$ 106 at the end of the experiment was only 0.40 msec, showing the high precision attainable by the online estimation system.

EKF-SLAM

To test the performance of the online estimation system of $t_d$ 106 in EKF-SLAM, the same dataset from the map-based localization was used, providing a baseline for comparison. The features used for EKF-SLAM consisted of the twenty LEDs 202, for which ground truth is available, as well as any additional features that were detected in the images via a Shi-Tomasi algorithm. Once the LED features were first detected and initialized by the system, they were kept in the state vector for the remainder of the experiment. The re-observations of these "persistent" features after each loop provided correction of position drift. On the other hand, each of the Shi-Tomasi features was kept in the state vector only for as long as it was visible after its initialization. When the feature dropped out of the camera field of view, it was removed from the state, to maintain the computational cost of the algorithm within real-time constraints. On average, in each image sixty-five "temporary" Shi-Tomasi features were tracked.

For the SLAM features the inverse-depth parametrization is used initially by the system, and then converted to the Cartesian XYZ parametrization to reduce computation. In addition to the features, the state vector of the filter comprises the time offset $t_d$, the IMU state, and the camera-to-IMU extrinsic calibration parameters. To ensure consistent estimation by the system, a modified-Jacobian approach described in (Li and Mourikis, 2013a) is employed.

The trajectory estimate computed by EKF-SLAM with concurrent estimation of both the spatial calibration between the camera and IMU and $t_d$ 106 is shown in FIG. 3 as dashed line 304, along with the estimated positions for the LED features (dots). The calculated trajectories estimated by the map-based method of the system and EKF-SLAM are very similar. The maximum error for EKF-SLAM at the known locations of the trajectory is 5.7 cm, while for the persistent features the maximum error is 7.0 cm.

Figure 5:
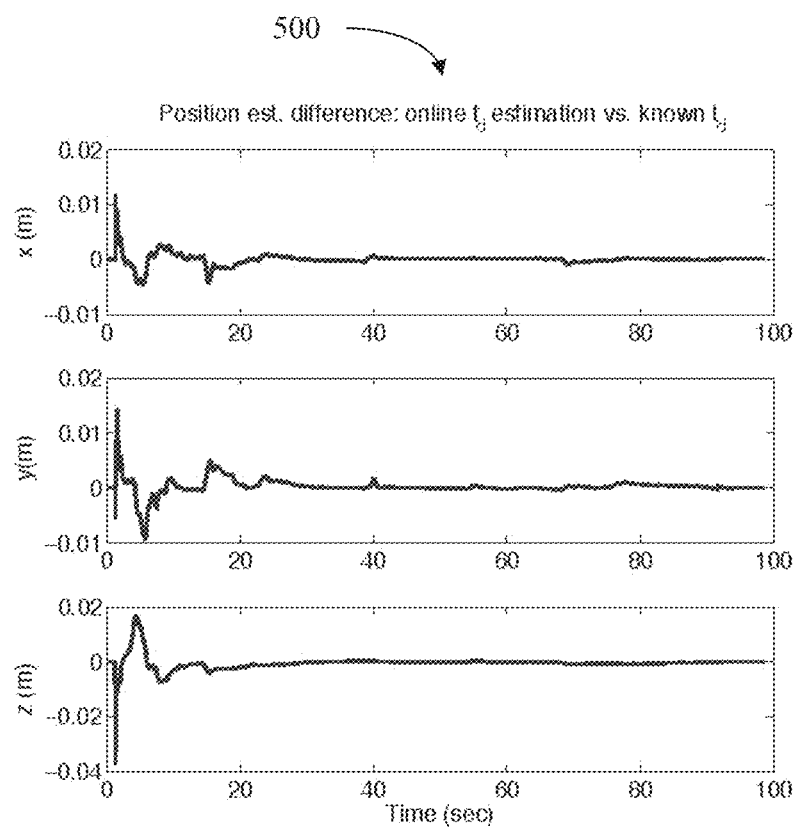
FIG. 5 is a chart plotting map-based localization differences in the position estimates computed by the system for comparison of concurrent localization and time offset estimation vs. localization with known time offset.

Referring now to FIG. 5, there is shown a chart 500 plotting the differences in the map-based localization position estimates, when the time offset is known in advance, and when it is estimated online. To examine the effects of online time-offset estimation on the reported estimates and their precision, the same dataset was re-processed using the final estimate for $t_d$ as an input, and disabling the online estimation portion of the system. As can be seen in the plot of the difference of the trajectory estimates computed by the two methods (online estimation system calculation of $t_d$ vs. a priori known $t_d$) is very small.

Figure 6:
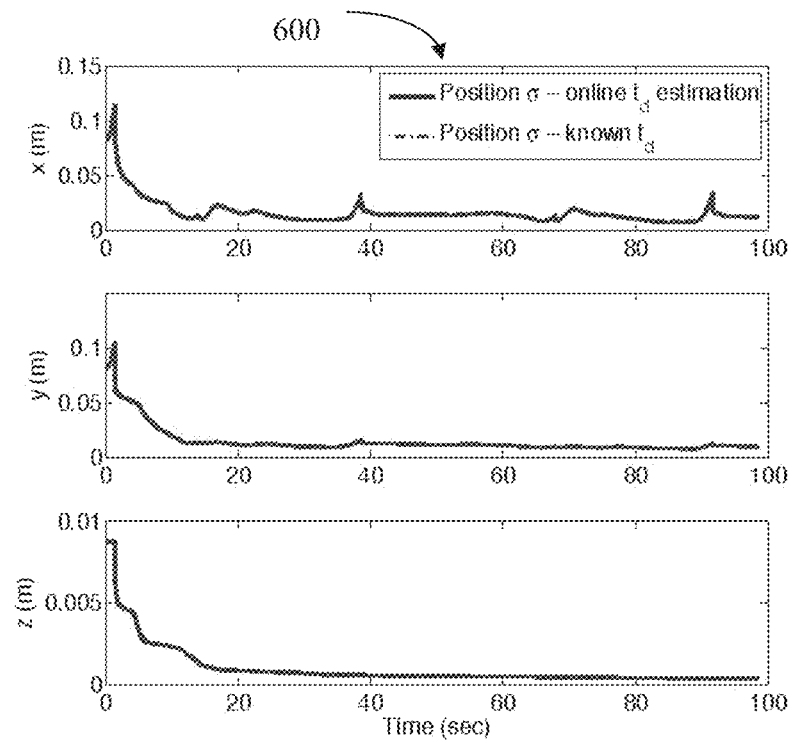
FIG. 6 is a chart plotting map-based localization of a filter's reported standard deviation computed by the system for comparison of concurrent localization and time offset estimation vs. localization with known time offset.

Referring now to FIG. 6, there is shown a chart 600 plotting the filter's reported standard deviation for certain state variables, in the case of map-based localization with concurrent time-offset estimation vs. localization with known time offset. The plot 600 shows the standard deviation reported by the two approaches. The plot 600 demonstrates that performing estimation of $t_d$ 106 online yields results that are almost identical to those would be obtained if $t_d$ 106 was known in advance. Therefore, it is evident that using the present system instead of an offline calibration procedure for determining $t_d$ 106 would result in no significant loss of performance.

Figure 7:
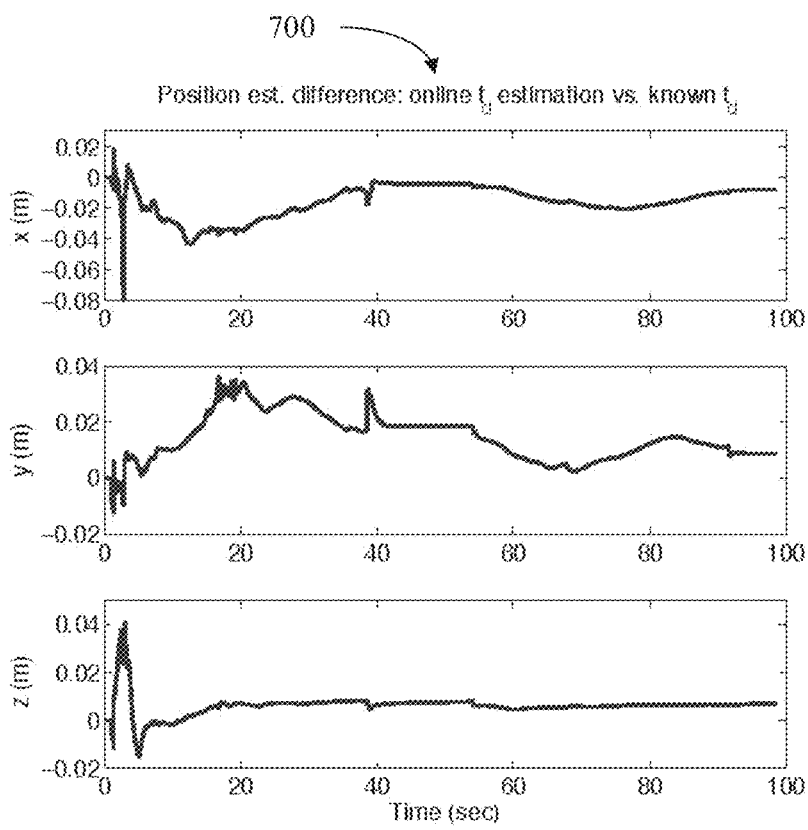
FIG. 7 is a chart plotting EKF-SLAM localization differences in the position estimates computed by the system for comparison of concurrent localization and time offset estimation vs. localization with known time offset.
Figure 8:
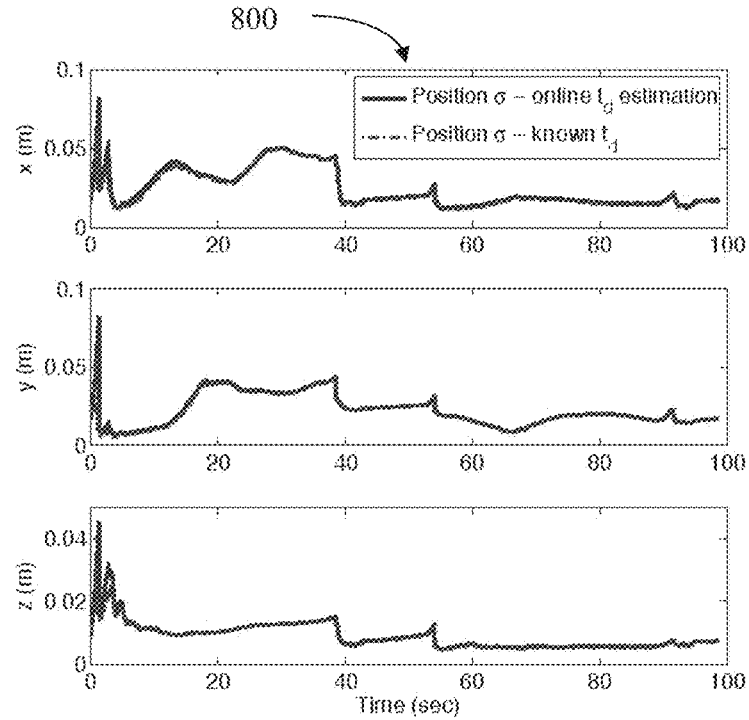
FIG. 8 is a chart plotting EKF-SLAM localization of a filter's reported standard deviation computed by the system for comparison of concurrent localization and time offset estimation vs. localization with known time offset.

Referring now to FIGS. 7 and 8, there is shown a chart 700 plotting EKF-SLAM localization differences in the position estimates and a chart 800 of a filter's reported standard deviation computed by the system for comparison of concurrent localization and time offset estimation vs. localization with known time offset. Similarly to the previous experiment, the data was re-processed in EKF-SLAM using the final $t_d$ estimate as an input to the system and disabling its online estimation. The difference in the trajectory estimates of the two approaches, as well as the reported position uncertainty, are shown respectively. These plots show that the difference in the trajectory estimates is very small (within one standard deviation for most of the trajectory), while the reported uncertainty is almost indistinguishable after the first few seconds of the experiment. It can be seen that, owing to fact that $t_d$ is identifiable even without known feature positions, the online estimation of $t_d$ calculated by the system does not incur any significant loss of performance.

Figures 9, 10:
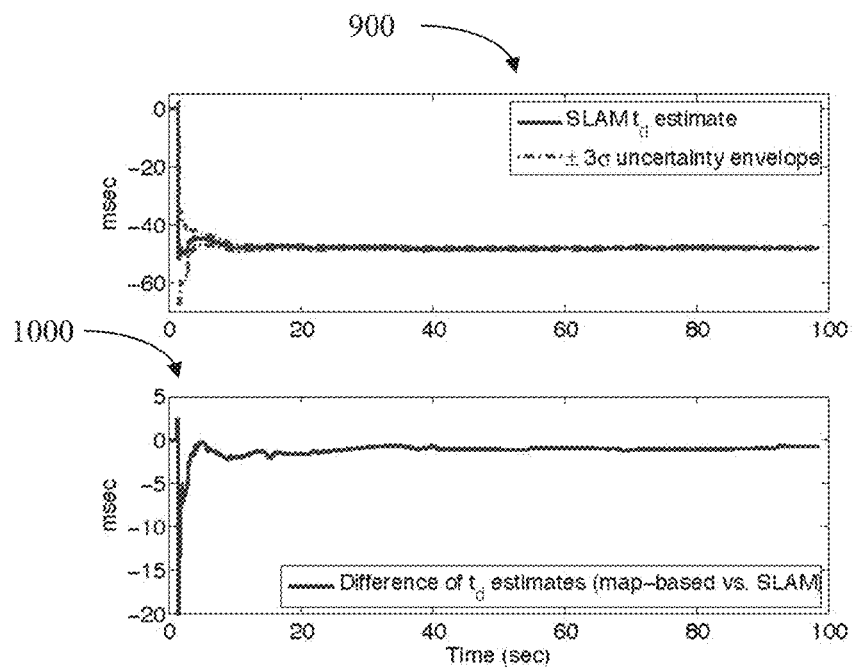
FIG. 9 is a chart plotting a time offset estimate computed by EKF-SLAM and a corresponding ±3 standard-deviation uncertainty envelope.
FIG. 10 is a chart plotting differences in time offset estimates of map-based and EKF-SLAM estimations.

Referring now to FIGS. 9 and 10, there is shown a chart 900 plotting a time offset estimate computed by EKF-SLAM and a chart 1000 corresponding ±3σ uncertainty envelope and differences in time offset estimates of map-based and EKF-SLAM estimations. As can be seen, the difference between the values of $t_d$ 106 computed in the map-based and EKF-SLAM experiments, is small. After the first 3 seconds in the trajectory, the two estimates are within 2.5 msec of each other, while the final estimates differ by 0.7 msec. The fact that the state estimates by the two different methods are so similar is a direct consequence of the identifiability of $t_d$ 106 in both cases, and indicates the robustness of the algorithms used in the system to perform the calculations.

Figure 11:
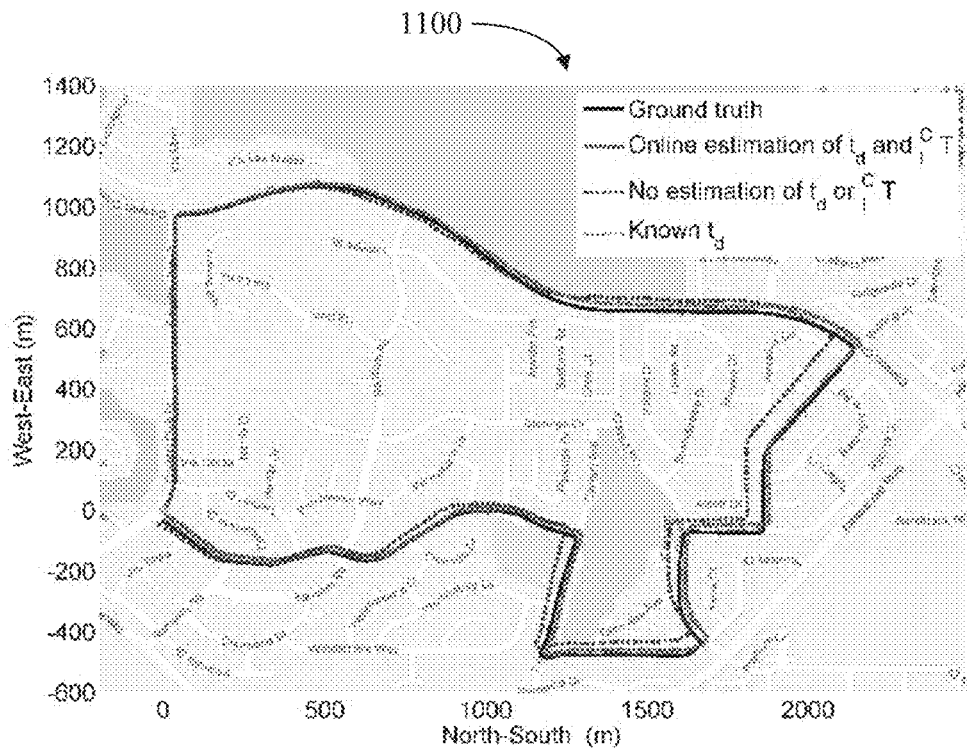
FIG. 11 is a map of an area showing visual-inertial odometry trajectory estimates for each method plotted versus ground truth.

Referring now to FIG. 11, there is shown a map of an area 1100 showing visual-inertial odometry trajectory estimates for each method, plotted versus ground truth. An additional outdoor driving experiment was carried out, to test the performance of visual-inertial odometry with the system, with concurrent estimation of $t_d$ 106 and the camera-to-IMU extrinsics. In the outdoor experiment, a camera-IMU system was mounted on the roof of a car driving in Riverside, Calif., covering a total of approximately 7.3 km in 11 minutes. The algorithm used by the system for estimation is the MSCKF 2.0 algorithm of (Li and Mourikis, 2013a), with the addition of the time offset in the state vector. Shi-Tomasi features are extracted in the images, and matched by normalized cross-correlation. The map shows: (i) the trajectory estimate computed by the system, (ii) the estimate obtained using the final estimate of $t_d$ 106 as a known input, and (iii) the estimate computed without online estimation of the camera-to-IMU calibration and $t_d$ 106 (for the calibration manual measurements were used, and $t_d$=0 was assumed in this case). For this experiment, ground truth obtained by a GPS-INS system is also shown.

Figure 12:
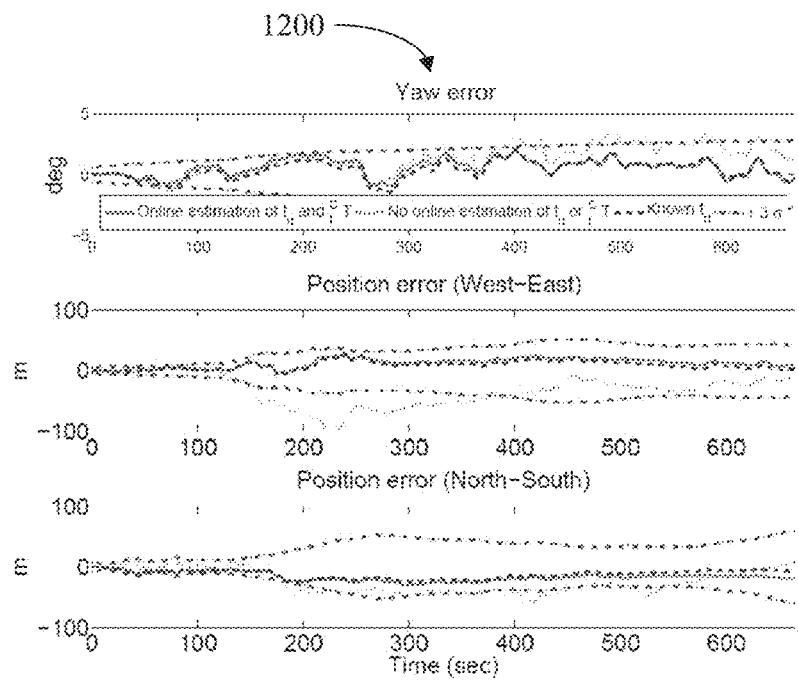
FIG. 12 is a chart plotting visual inertial odometry showing yaw and horizontal position errors by of the methods in a real-world experiment.

Referring now to FIG. 12, there is shown a chart 1200 plotting the results of visual inertial odometry in the real-world experiment. The plot 1200 shows the orientation (yaw) and horizontal position errors for the three methods compared. The plot 1200 also shows the predicted uncertainty envelope computed as ±3 times the standard deviation reported by the methods. As can be seen, the method implemented in the system described here, which conducts online estimation of the time offset between the camera and IMU, provides accurate estimates (the error remains below 0.5% of the traveled distance), that are within the reported uncertainty envelope, indicating consistency of the results. Similarly, to the cases of map-based estimation and SLAM, the results of the algorithm used by the system with online estimation of $t_d$ are very similar to those obtained with a known $t_d$. Moreover, the system is considerably more accurate than the case where $t_d$ and the camera-to-IMU calibration are assumed to have "nominal" values.

Simulation Tests—Map-based Localization

To examine the statistical properties of the system, fifty Monte-Carlo trials were performed. In each trial, the rotation and translation between the IMU and the camera were set equal to known nominal values, with the addition of random errors δp, and δθ. In each trial, δp and δθ were randomly drawn from zero-mean Gaussian distributions with standard deviations equal to $\sigma_p$=0.1 m and $\sigma_\theta$=1.0 degree along each axis, respectively. In addition, $t_d$ was randomly drawn from the Gaussian distribution N (0, $\sigma_t$), with $\sigma_t$=50 msec, and kept constant for the duration of the trial. Time offsets in the order of tens of milliseconds are typical of most systems used today.

TABLE I

RMS errors in the map-based simulations
RMS errors

| $^G p_I$ | $_G\bar{q}$ | $^G v_I$ | $^C p_I$ | $_I^C\bar{q}$ | $t_d$ |
|---|---|---|---|---|---|
| 0.096 m | 0.10° | 0.021 m/sec | 0.088 m | 0.036° | 1.519 msec |

Table I shows the RMS errors for the IMU position, orientation, and velocity, as well as for the camera-to-IMU transformation and the time offset calculated by the system during map-based estimation. The values shown are averages over all Monte-Carlo trials, and over the second half of the trajectory (i.e., after the estimation uncertainty has reached steady state). This table shows that the system provides precise estimation of all the variables of interest, including the time offset $t_d$.

Additionally, to examine the consistency of the state estimates were computed for the normalized estimation error squared (NEES) for the IMU state, the camera-to-IMU transformation, and $t_d$ 106, each averaged over all Monte-Carlo trials and all time-steps. If the estimator is consistent, i.e., if it reports an appropriate covariance matrix for its state estimates, the NEES should have an average value equal to the dimension of the error state. In tests, the average NEES values computed by the system were 15.32 for the IMU state, 6.6 for the camera-to-IMU transformation, and 0.99 for $t_d$, close to the theoretical expectations. This indicates that the estimator in the system is consistent, and that the covariance matrix reported by the EKF is an accurate description of the actual uncertainty of the estimates.

Simulation Tests—EKF-SLAM

For SLAM simulations, trajectories were generated that were similar to the trajectory of the real-world experiment presented previously. The simulated IMU-camera system moved in a 7×12×5 m room for 90 seconds, at an average velocity of 0.37 m/sec. The sensor characteristics were the same as in the real-world experiment described previously. A total of 50 persistent features were placed on the walls of the room, and in each image 100 additional temporary features were generated with depths uniformly distributed between 1.5 and 10 meters.

TABLE II

RMS errors in the EKF-SLAM simulations
RMS errors

| $^G p_I$ | $_G\bar{q}$ | $^G v_I$ | $^C p_I$ | $_I^C\bar{q}$ | $^G p_f$ | $t_d$ |
|---|---|---|---|---|---|---|
| .078 m | .26° | .017 m/sec | .01 m | .07° | .094 m | 0.1 msec |

Table II shows the RMS errors for the IMU position, orientation, and velocity, as well as for the camera-to-IMU transformation, feature positions, and the time offset, averaged over all Monte-Carlo trials, and over the second half of the trajectory. Similar to what was observed in the case of map-based localization, the time-offset between the sensors can be very accurately estimated by the system, owing to its identifiability. The average NEES values have been computed as 17.00 for the IMU state, 6.66 for the camera-to-IMU transformation, and 0.87 for $t_d$. Again, these are close to the theoretically expected values. For the feature position the average NEES is 4.48, slightly above the theoretically expected value of 3. This slight increase in the feature NEES is expected, as EKF-SLAM is known to be sensitive to the nonlinearity of the measurement models.

Simulation Tests—Visual-Inertial Odometry

To obtain realistic simulation environments for visual-inertial odometry, simulation data was generated based on a real-world dataset. Specifically, the ground truth trajectory (position, velocity, orientation) for the simulations was generated from the ground truth of a real-world dataset that was approximately 13 minutes, 5.5 km long. Using this trajectory, IMU measurements were subsequently generated and corrupted with noise and biases, as well as visual feature tracks with characteristics matching those in the real-world data. For each trial the camera-to-IMU transformation and the time offset were generated in a way identical to the map-based simulations, by perturbing known nominal values.

In the tests, the performance of visual-inertial odometry was compared using the MSCKF-based approach described earlier in four cases: (i) online camera-to-IMU calibration enabled, but $t_d$ estimation disabled, (ii) $t_d$ estimation enabled, but camera-to-IMU calibration disabled, (iii) both $t_d$ and camera-to-IMU calibration estimation enabled (i.e., the approach implemented in our system), and (iv) the case where $t_d$ and the camera-to-IMU calibration are perfectly known and not estimated. In the first three cases (termed the "imprecise" ones), the exact values of the parameters are not known (only their nominal values are known). When a particular parameter is not estimated, it is assumed to be equal to the nominal value. By comparing these three cases, the necessity and effectiveness of the online estimation system of individual parameters can be evaluated. Moreover, by comparing the system results against case (iv), where all parameters are perfectly known (the "precise" scenario), the loss of accuracy incurred due to the uncertainty in the knowledge of these parameters can be assessed.

TABLE III

| Scenario | imprecise | | | precise | |
|---|---|---|---|---|---|
| Extrinsic calib. | on | off | on | N/A | |
| $t_d$ estimation | off | on | on | N/A | |
| Pose RMSE | 54.60 | 18.39 | 8.11 | 7.93 | North (m) |
| | 81.82 | 13.50 | 5.18 | 5.00 | East (m) |
| | 14.53 | 45.07 | 0.64 | 0.53 | Down (m) |
| | 0.39 | 0.18 | 0.06 | 0.06 | roll (°) |
| | 0.33 | 0.18 | 0.05 | 0.05 | pitch (°) |
| | 1.19 | 1.22 | 0.70 | 0.69 | yaw (°) |
| IMU state NEES | 85.4 | 2046 | 14.6 | 14.5 | |
| Calib. RMSE | 0.07 | N/A | 0.01 | N/A | $^C p_I$ (m) |
| | 0.31 | N/A | 0.05 | N/A | $_I^C\bar{q}$ (°) |
| | N/A | 0.28 | 0.25 | N/A | $t_d$ (msec) |

Table III shows the average RMSE and NEES for the four cases, averaged over 50 Monte-Carlo trials using the system. For clarity, the position errors are reported in the NED (North-East-Down) frame, and IMU orientation in roll-pitch-yaw. It can be seen that, to be able to accurately estimate the IMU's motion, both the frame transformation and the time offset between the camera and IMU must be estimated. If either of these is falsely assumed to be perfectly known, the estimation accuracy and consistency are considerably degraded (see the first two columns in Table III). Moreover, by comparing the third and fourth columns, it can be seen that the accuracy obtained by the online estimation system is very close to that obtained when both calibration and $t_d$ are perfectly known. This result, which was also observed in the real-world experiments, is significant from a practical standpoint: it shows that the system, initialized with rough estimates, can provide pose estimates almost indistinguishable to what would be obtained if offline calibration was performed in advance.

Simulation Tests—Time-varying $t_d$

For all the results presented up to now, a constant time offset was used. In this instance, the case of a time-varying $t_d$ 106 in visual inertial-odometry was also examined. Instead of presenting Monte-Carlo simulation results (which look similar to those in Table III), it is interesting to show the results of a single representative trial. In this trial, the time offset varies linearly from 50 msec at the start, to 300 msec at the end, modeling a severe clock drift (250 msec in 13 minutes).

Figure 13:
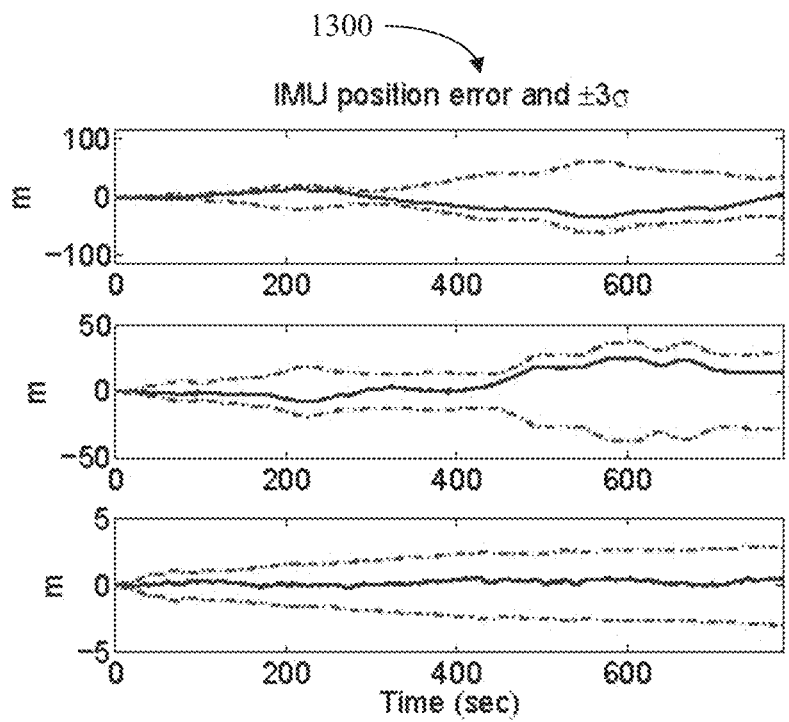
FIG. 13 is a chart plotting visual-inertial odometry with unknown features and drifting time-offset of IMU position errors in the North, East, Down directions, where estimation errors are shown in solid lines and associated ±3σ envelopes are shown in dash-dotted lines.

Referring now to FIG. 13, there is shown a chart 1300 plotting results from application of our system in visual-inertial odometry with unknown features and drifting time-offset. The plot shows the IMU position errors in the North, East, Down directions, where estimation errors are shown in solid lines and associated ±3σ envelopes are shown in dash-dotted lines.

Figure 14:
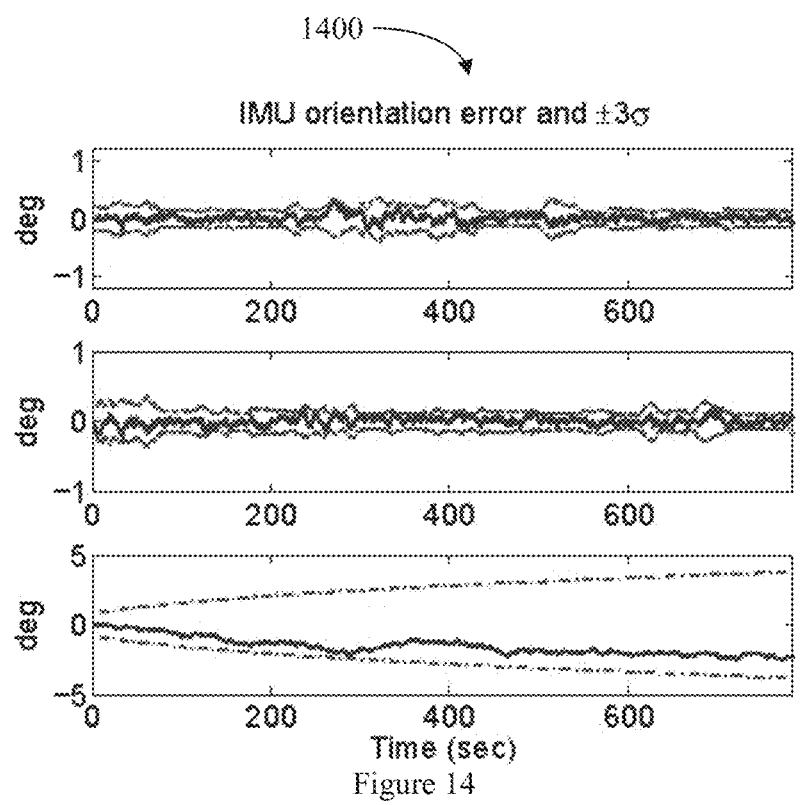
FIG. 14 is a chart plotting visual-inertial odometry with unknown features and drifting time-offset of IMU orientation errors in roll, pitch, and yaw, where estimation errors are shown in solid lines and associated ±3 standard-deviation uncertainty envelopes are shown in dash-dotted lines.

Referring now to FIG. 14, there is shown a chart 1400 of the results for the roll, pitch, and yaw in the same experiment, where estimation errors are shown in solid lines and associated ±3σ envelopes are shown in dash-dotted lines.

Figure 15:
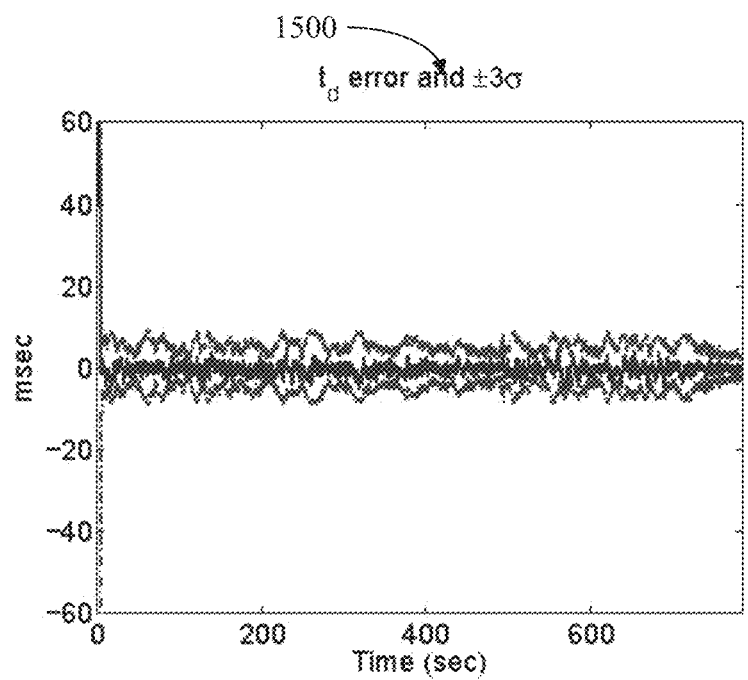
FIG. 15 is a chart plotting visual-inertial odometry with unknown features and drifting time-offset of error in the estimate of the time offset, where estimation errors are shown in solid lines and associated ±3σ envelopes are shown in dash-dotted lines.
Figure 16:
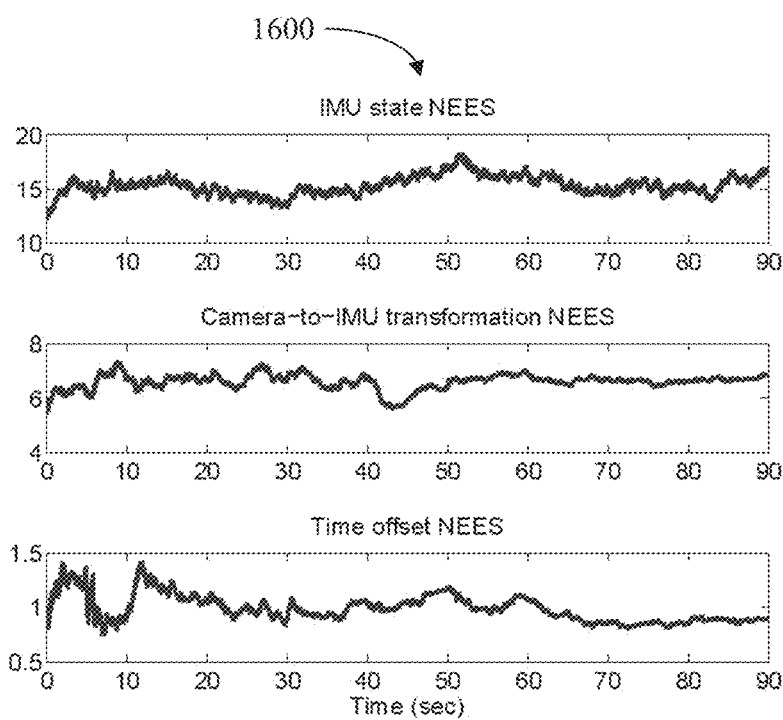
FIG. 16 is a chart plotting map-based simulation averages of normalized estimation error squared values over fifty Monte-Carlo simulations.

Referring now to FIG. 15, there is shown a chart 1500 plotting the error in the estimate of the time offset, as well as the associated ±3σ envelopes, for the same visual-inertial odometry experiment as the one pertaining to FIGS. 13 and 14.

Referring to FIGS. 13, 14 and 15 it can be seen that even in challenging situations the time offset, $t_d$ 106, between the camera and IMU during vision-aided inertial navigation. The key component of the system is that the variable $t_d$ 106 is explicitly included in the estimator's state vector, and estimated jointly with all other variables of interest. This makes it possible for the system to track time-varying offsets, to characterize the uncertainty in the estimate of $t_d$, and to model the effect of the imperfect knowledge of $t_d$ 106 on the accuracy of the estimates, in a natural way. Moveover, $t_d$ 160 is identifiable in general trajectories, which guarantees the effectiveness of the system. A detailed characterization of the critical motion cases that lead to loss of identifiability of $t_d$ 106 reveals that they are either (i) cases that are known to cause loss of observability even with a perfectly known $t_d$ 106, or (ii) cases that are unlikely to occur in practice. Simulations and experimental results using the system indicate that the system provides high-precision estimates for both motion, as well as for the temporal and spatial alignment between the camera and IMU.

What has been described is a new and improved system and method for a 3-D motion estimation and online temporal calibration system for a camera inertial measurement unit, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A system for 3-D motion estimation of a moving platform including one or more than one camera and one or more than one inertial measurement unit, the system comprising:
   one or more than one processor;
   the one or more than one camera operably connected to the one or more than one processor and configured to produce at least one visual image;
   the one or more than one inertial measurement unit operably connected to the one or more than one processor and configured to produce at least one inertial measurement;
   a storage for storing data and instructions executable on the one or more than one processor comprising an estimation module that calculates online:
      estimates of a time offset between time stamps associated with images from the one or more cameras and time stamps associated with the one or more inertial measurement units, wherein each of said time offset estimates is based on both of (i) one of the time stamps associated with images from the one or more cameras and (ii) one of the time stamps associated with the one or more inertial measurement units; and
      employs the time offset estimates to estimate a state of the moving platform;
   wherein the processor is configured to:
   receive the at least one visual image from the one or more than one camera, the at least one inertial measurement from the one or more than one inertial measurement unit, at least one visual image timestamp for the at least one visual image, and at least one inertial measurement timestamp for the at least one inertial measurement;
   calculate online the time offset from the at least one visual image timestamp and the at least one inertial measurement timestamp using the estimation module, wherein the estimation module generates Jacobian matrices with respect to the time offset; and
   generate estimates of a state of the moving platform based on the calculated time offset.

2. The system of claim 1, wherein the camera and the inertial measurement unit are in an environment containing features with known 3D coordinates.

3. The system of claim 1, wherein the camera and the inertial measurement unit are in an environment containing features with a priori unknown 3D coordinates.

4. The system of claim 1, wherein the time offset for each camera is the amount of time that the one or more than one camera timestamp is shifted, so that the one or more than one camera and the inertial measurement unit data streams become temporally consistent.

5. The system of claim 1, where the system has a state and the state of the system comprises one or more than one of the position, orientation, velocity, of the system.

6. The system of claim 1, where the system has a state and the state of the system includes a description of the spatial configuration between the one or more than one camera and the one or more than one inertial measurement unit.

7. A method for a 3-D motion estimation of a moving platform including one or more than one camera and one or more than one inertial measurement unit, the method comprising the steps of:
provinding the system of claim 1;
instructions executable on the one or more than one processor for the steps of:
receiving at least one visual image from the one or more than one camera;
receiving at least one inertial measurement from the one or more than one inertial measurement unit;
receiving at least one visual image timestamp for the at least one visual image;
receiving at least one inertial measurement timestamp for the at least one inertial measurement;
calculating online a time offset estimate from both the at least one visual image timestamp and the at least one inertial measurement timestamp using an estimator; and
employing the calculated time offset estimate to estimate a state of the moving platform.

8. A method for a 3-D motion estimation of a moving platform including one or more than one camera and one or more than one inertial measurement unit, the method comprising the steps of:
a) providing a system for 3-D motion estimation of a moving platform, wherein the system comprises a processor comprising an estimation module, a camera, an inertial measurement unit, and a storage for storing data and instructions executable on the estimation module;
b) receiving at least one visual image from the camera;
c) receiving at least one inertial measurement from the inertial measurement unit;
d) receiving at least one visual image timestamp for the at least one visual image;
e) receiving at least one inertial measurement timestamp for the at least one inertial measurement;
f) calculating online a time offset from the at least one visual image timestamp and the at least one inertial measurement timestamp using a filter, wherein the filter is based on Jacobian matrices of the inertial measurements with respect to the time offset; and
g) generating estimates of a state of the moving platform based on the calculated time offset;
h) propagating the state estimates from inertial measurement unit measurements;
i) processing the least one visual image for updating the state estimates; and
j) modeling effects of errors in the time offset.

9. The method of claim 7, wherein calculating a time-offset estimate is performed by an extended Kalman filter for simultaneous localization and mapping.

10. The method of claim 7, wherein the system further comprises a filter, and the filter estimates:
an inertial measurement unit state, comprising an inertial measurement unit position, velocity, orientation, and biases;
the spatial transformation between the camera and inertial measurement unit frames;
time offsets between measurement unit data streams; and
positions of visual features.

11. The method of claim 8, wherein the step of calculating explicitly includes the time offset in an extended-Kalman filter state vector.

12. The method of claim 8, wherein step f) is performed without known feature positions.

13. The method of claim 8 further comprising the step of extracting motion information from feature measurements and fusing the extracted motion information with state estimates, inertial measurement unit measurements or both state estimates and inertial measurement unit measurements.

14. The method of claim 8 further comprising the step of concurrently calculating estimates of the time offset and the camera-to-inertial measurement unit extrinsics for visual-inertial odometry.

15. The method of claim 8 further comprising the step of calculating temporal and spatial alignment between the one or more than one camera and the one or more than one inertial measurement unit.

16. A method for a 3-D motion estimation of a moving platform including one or more than one camera and one or more than one inertial measurement unit, the method comprising the steps of:)
a) providing a system for 3-D motion estimation of a moving platform, wherein the system comprises a processor comprising an estimator, a camera, an inertial measurement unit, and a storage for storing data and instructions executable on the estimation module;
b) receiving at least one visual image from the camera;
c) receiving at least one inertial measurement from the inertial measurement unit;
d) receiving at least one visual image timestamp for the at least one visual image;
e) receiving at least one inertial measurement timestamp for the at least one inertial measurement;
f) calculating online a time offset from the at least one visual image timestamp and the at least one inertial measurement timestamp using the estimator, wherein the estimator generates Jacobian matrices with respect to the time offset; and
g) generating estimates of a state of the moving platform based on the calculated time offset.

17. The method of claim 16 comprising the additional step of propagating the state estimates from inertial measurement unit measurements.

* * * * *